United States Patent
Taylor et al.

(10) Patent No.: US 9,843,244 B2
(45) Date of Patent: *Dec. 12, 2017

(54) NITROGEN- AND CERAMIC-SURFACE-TREATED COMPONENTS FOR DOWNHOLE MOTORS AND RELATED METHODS

(71) Applicant: Baker Hughes Incorporated, Houston, TX (US)

(72) Inventors: Kyle L. Taylor, Spring, TX (US); Chih C. Lin, Huntsville, TX (US); Denis S. Kopecki, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 14/800,359

(22) Filed: Jul. 15, 2015

(65) Prior Publication Data

US 2015/0316052 A1 Nov. 5, 2015

Related U.S. Application Data

(63) Continuation of application No. 13/926,433, filed on Jun. 25, 2013, now Pat. No. 9,112,398.

(51) Int. Cl.
*F01C 1/10* (2006.01)
*F03C 2/00* (2006.01)
(Continued)

(52) U.S. Cl.
CPC ............... *H02K 15/02* (2013.01); *C23C 8/04* (2013.01); *C23C 8/26* (2013.01); *F03C 2/08* (2013.01);
(Continued)

(58) Field of Classification Search
CPC .... F04C 2/1071; F04C 2/1073; F04C 2/1075; F04C 13/008; F04C 18/1075;
(Continued)

(56) References Cited

U.S. PATENT DOCUMENTS 3,916,506 A 11/1975 Wolf
5,395,221 A 3/1995 Tucker et al.
(Continued)

OTHER PUBLICATIONS

International Search Report for International Application No. PCT/US2014/043873 dated Oct. 29, 2014, 3 pages.
(Continued)

*Primary Examiner* — Theresa Trieu
(74) *Attorney, Agent, or Firm* — TraskBritt (57) ABSTRACT

Downhole tools for earth-boring applications may include a component of a steel material and including a bore. An inner surface defining the bore may be treated with a surface treatment. The surface treatment may include a nitrided region having nitrogen diffused into the steel material and a ceramic material adjacent to the nitrided region; the ceramic material defining the inner surface. Methods of making downhole tools for earth-boring applications may involve exposing a component of the downhole tool to an elevated temperature to heat the component in a nitrogen-rich environment. Nitrogen may be diffused into a steel material of the component and a nitrided region may be formed at one or more surfaces of the component. A ceramic material may be coated on the nitrided region of the component.

20 Claims, 5 Drawing Sheets (51) Int. Cl.

| | |
|---|---|
| *F03C 4/00* | (2006.01) |
| *F04C 2/00* | (2006.01) |
| *F04C 5/00* | (2006.01) |
| *F04C 18/00* | (2006.01) |
| *H02K 15/02* | (2006.01) |
| *C23C 8/26* | (2006.01) |
| *C23C 8/04* | (2006.01) |
| *F04C 2/107* | (2006.01) |
| *F03C 2/08* | (2006.01) |
| *F04C 13/00* | (2006.01) |
| *H02K 15/12* | (2006.01) |

(52) U.S. Cl.
CPC .......... *F04C 2/1075* (2013.01); *F04C 13/008* (2013.01); *H02K 15/12* (2013.01); *F04C 2230/91* (2013.01); *F04C 2230/92* (2013.01); *F05C 2203/08* (2013.01); *Y10T 29/49012* (2015.01)

(58) Field of Classification Search
CPC .............. F04C 2230/91; F04C 2230/41; F04C 2230/40; F04C 2240/10; F04C 2230/92; F01C 1/101; F05C 2203/08; H02K 15/02; H02K 15/12; C23C 8/04; C23C 8/26; Y10T 29/49012
USPC ......... 418/1, 48, 152, 178–179; 29/888.023; 148/212, 230
See application file for complete search history.

(56) References Cited

U.S. PATENT DOCUMENTS

| | | |
|---|---|---|
| 5,508,334 A | 4/1996 | Chen |
| 6,117,280 A | 9/2000 | Yaginuma et al. |
| RE37,127 E | 4/2001 | Schader et al. |
| 6,248,149 B1 | 6/2001 | Massey et al. |
| 6,354,824 B1 | 3/2002 | Mills |
| 6,543,132 B1 | 4/2003 | Krueger et al. |
| 7,343,990 B2 | 3/2008 | Pessier et al. |
| 7,878,774 B2 | 2/2011 | Speckert |
| 8,333,231 B2 | 12/2012 | Hooper et al. |
| 2007/0107942 A1 | 5/2007 | Overstreet et al. |
| 2008/0127475 A1 | 6/2008 | Griffo |
| 2009/0044984 A1 | 2/2009 | Massey et al. |
| 2009/0152009 A1 | 6/2009 | Slay et al. |
| 2009/0152013 A1 | 6/2009 | Buske et al. |
| 2010/0038142 A1 | 2/2010 | Snyder et al. |
| 2010/0098569 A1 | 4/2010 | Robisson et al. |
| 2010/0224418 A1 | 9/2010 | Eason et al. |
| 2011/0073233 A1 | 3/2011 | Eason et al. |
| 2012/0018227 A1 | 1/2012 | Puzz et al. |
| 2014/0377112 A1 | 12/2014 | Taylor et al. |

OTHER PUBLICATIONS

International Written Opinion for International Application No. PCT/US2014/043873 dated Oct. 29, 2014, 8 pages.

NITROGEN- AND CERAMIC-SURFACE-TREATED COMPONENTS FOR DOWNHOLE MOTORS AND RELATED METHODS

CROSS-REFERENCE TO RELATED APPLICATION

This application is a continuation of U.S. patent application Ser. No. 13/926,433, filed Jun. 25, 2013, now U.S. Pat. No. 9,112,398, issued Aug. 18, 2015, the disclosure of which is incorporated herein in its entirety by this reference.

FIELD

The disclosure relates generally to downhole motors for earth-boring applications. More specifically, disclosed embodiments relate to surface treatments for stators of Moineau-type motors that may increase temperature, corrosion, and wear resistance of the stators.

BACKGROUND

To obtain hydrocarbons such as oil and gas from subterranean formations, wellbores are drilled into the formations by rotating a drill bit attached to an end of a drill string. A substantial portion of current drilling activity involves what is referred to in the art as "directional" drilling. Directional drilling involves drilling deviated (e.g., horizontal) wellbores, as opposed to straight, vertical wellbores. Modern directional drilling systems conventionally employ a bottom hole assembly at the end of the drill string that includes a drill bit and a downhole motor to drive rotation of the drill bit. The drill bit is coupled to a drive shaft of the downhole motor, and drilling fluid pumped through the motor to the drill bit from the surface drives rotation of the drive shaft to which the drill bit is attached. Such downhole motors are commonly referred to in the drilling industry as "mud motors," "hydraulic drilling motors," and "Moineau motors."

Downhole motors include a power section that contains a stator and a rotor located within the stator. The stator may include a tubular metal housing having a helically contoured or lobed elastomeric material (e.g., a rubber liner) on walls of an internal bore defined by the housing. The rotor is usually made from a suitable metal, such as steel, and has an outer lobed surface. Pressurized drilling fluid (e.g., drilling "mud") laden with a substantial volume of solids is pumped into a progressive cavity formed between the rotor and the stator lobes. The force of the pressurized fluid pumped into and through the cavity causes the rotor to rotate. The shaft of the rotor is coupled to a bearing assembly having a drive shaft (e.g., a "drive sub"), which in turn rotates the drill bit attached to the drive shaft.

As drilling fluid flows through the progressive cavity between the rotor and the stator, the drilling fluid may abrade and erode surfaces of the rotor and the stator within the progressive cavity. Such abrasion and erosion may be relatively more severe at locations at which the direction of fluid flow changes, since the drilling fluid and particularly the solids suspended therein, may impinge on the surfaces at relatively higher angles at such locations. Removal of material due to abrasion and erosion can eventually result in the alteration of the profile of lobes of the rotor as well as the profile of interior surfaces of the stator, which can adversely affect operation of the hydraulic drilling motor. In addition, the high downhole temperatures experienced during drilling may degrade the materials of downhole motors, particularly the elastomeric material located on the walls defining the inner bore of the stator. When the elastomeric materials degrade, portions of the stator and rotor that are intended to seal against one another may leak and permit drilling fluid to bypass the intended confined flow path between the stator and rotor, which reduces the efficiency and power of the downhole motor for a given flow rate.

BRIEF SUMMARY

In some embodiments, downhole motors may comprise a rotor, and a stator, which may comprise a steel material, having a bore therethrough. At least one surface of the stator may have a surface treatment including a nitrided region having nitrogen diffused into the steel material and a ceramic material adjacent to the nitrided region, the ceramic material defining an interior surface of the stator.

In other embodiments, methods of making downhole motors may comprise exposing a stator to an elevated temperature to heat the stator in a nitrogen-rich environment. Nitrogen may be diffused into a steel material of the stator to form a nitrided region at an interior surface of the stator, which interior surface may define a bore for receiving a rotor within the stator. The stator may be cooled from the elevated temperature. The stator may be removed from the nitrogen-rich environment. A ceramic material may be coated on the nitrided region of the stator, and a rotor may be positioned within the stator bore.

BRIEF DESCRIPTION OF THE DRAWINGS

While the disclosure concludes with claims particularly pointing out and distinctly claiming specific embodiments, various features and advantages of embodiments of the disclosure may be more readily ascertained from the following description when read in conjunction with the accompanying drawings, in which:

DETAILED DESCRIPTION

The illustrations presented herein are not meant to be actual views of any particular act in a method of applying a surface treatment, downhole motor, or component of a downhole motor, but are merely idealized representations employed to describe illustrative embodiments. Thus, the drawings are not necessarily to scale.

Disclosed embodiments relate generally to surface treatments for stators of Moineau-type mud motors that may increase temperature, corrosion, and wear resistance of the stators. More specifically, disclosed are embodiments of surface treatments that may include nitrided steel materials to increase their wear resistance and increase the component's ability to adhere to subsequently applied ceramic coatings, each of which may maintain structural integrity when exposed to increased operating temperatures.

Figure 1:
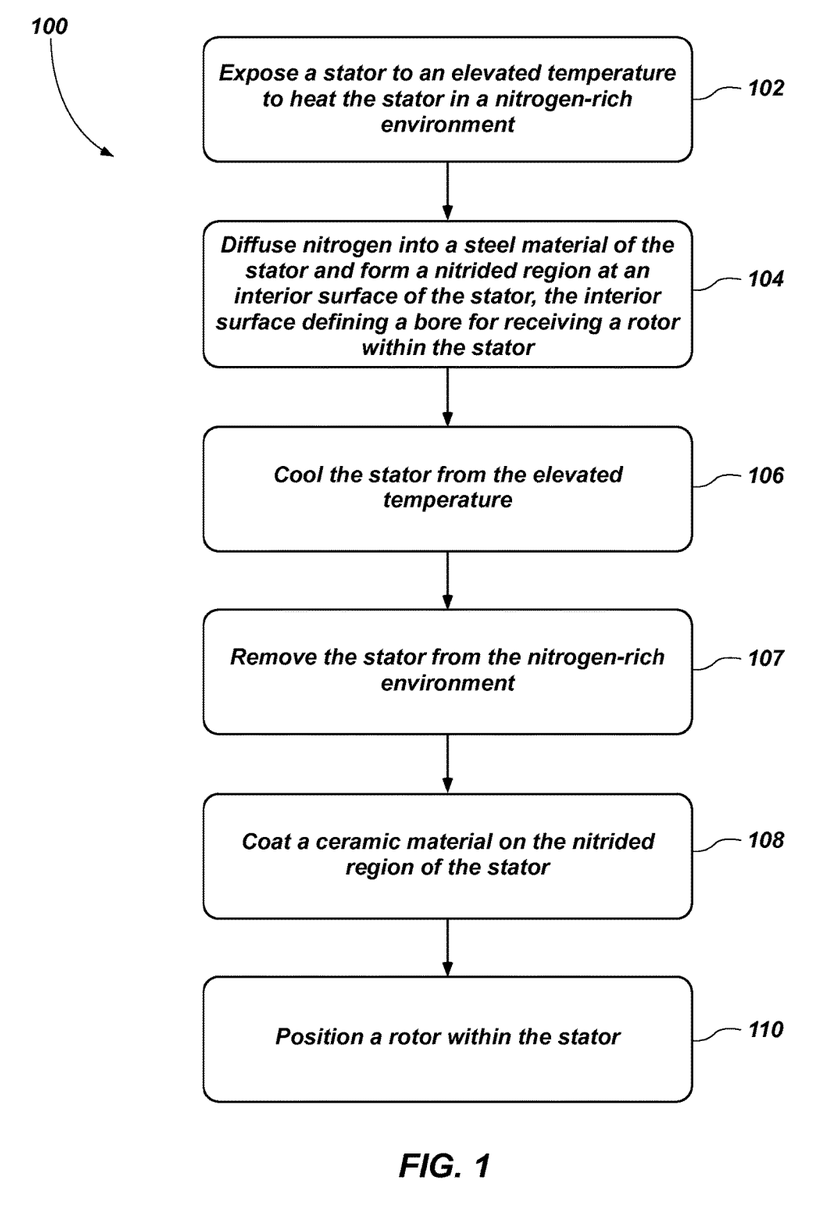
FIG. 1 is a flowchart of a method of applying a surface treatment to a stator of a downhole motor.

Referring to FIG. 1, a flowchart of a method 100 of applying a surface treatment to a stator of a downhole motor and assembling the downhole motor is shown. The method 100 may include exposing a stator to be used in a downhole motor to an elevated temperature to heat the stator, as indicated at 102. The stator may be heated, for example, within a furnace in which both the temperature and atmosphere may be controlled. The elevated temperature to which the stator may be exposed may be, for example, about 800° F. (~430° C.) or greater. More specifically, the stator may be heated in a furnace at a temperature of, for example, between about 800° F. (~430° C.) and about 1,333° F. (~720° C.). As a specific, nonlimiting example, the stator may be heated in a furnace at a temperature of between about 925° F. (~500° C.) and about 1,050° F. (~570° C.) (e.g., about 975° F. (~520° C.)).

The stator may be exposed to a nitrogen-rich environment while the stator is heated, as indicated at 102. For example, the stator may be exposed to an environment comprising at least about 60% by volume dissociated ammonia. More specifically, the stator may be exposed to an atmosphere of, for example, between about 15% and about 85% dissociated ammonia. As specific, nonlimiting examples, the stator may be exposed to an atmosphere of between about 15% and about 35% or between about 60% and about 85% dissociated ammonia. A nitrogen-rich atmosphere may be produced by reacting ammonia in a reactor with a substance having a high affinity for hydrogen in some embodiments, which may cause the hydrogen atoms of the ammonia to dissociate from the nitrogen atoms of the ammonia. The resulting nitrogen-rich atmosphere may be introduced into the furnace (e.g., by flowing a stream of the reaction product through the furnace). In other embodiments, ammonia may be directly introduced into the atmosphere in the furnace, and may naturally dissociate on contact with the heated stator.

Nitrogen may be diffused into a steel material of the stator to form a nitrided region at an interior surface of the stator, which interior surface may define a bore for receiving a rotor within the stator, as indicated at 104. For example, exposure of the stator to the nitrogen-rich environment and the elevated temperature may be maintained for at least about 1 hour to enable nitrogen from the environment to diffuse into the steel material of the stator. More specifically, exposure of the stator to the nitrogen-rich environment and the elevated temperature may be maintained for between about 3 hours and about 8 days. As a specific, nonlimiting example, exposure of the stator to the nitrogen-rich environment and the elevated temperature may be maintained for between about 72 hours and about 144 hours (e.g., about 84 hours). The steel material of the stator may comprise, for example, 414511 MOD steel with a microstructure of 100% martensite prior to its introduction into the furnace.

The nitrided region may comprise, for example, a solid solution of interstitial nitrogen diffused among the ferrite lattice and nitride and/or carbon nitride precipitation. The nitrides of the nitrided region may comprise, for example, $\epsilon\text{-Fe}_{2-3}(C, N)$; $\gamma'\text{-Fe}_4N$; or a mixture of $\epsilon\text{-Fe}_{2-3}(C, N)$ and $\gamma'\text{-Fe}_4N$ phases, commonly referred to as a "white layer" or "compound layer" resulting from the nitriding process. By way of contrast, the steel material directly adjacent to the nitrided region may lack nitride formation, though some interstitial nitrogen may have diffused among the ferrite lattice of the steel material.

In some embodiments, surfaces of the stator may be nitrided in a one-step process. For example, the stator may be heated in a furnace at between about 925° F. (~500° C.) and about 975° F. (~520° C.) in a nitrogen-rich environment for up to 84 hours. In other embodiments, surfaces of the stator may be subjected to a nitriding process in a two-step process. For example, the stator may be heated in a furnace at about 975° F. (~520° C.) in an atmosphere of between about 15% and about 35% dissociated ammonia for between about 4 hours to about 8 hours. Subsequently, the stator may be heated in the furnace at about 1025° F. (~550° C.) in an atmosphere of between about 60% and about 80% dissociated ammonia for between about 40 hours and about 90 hours.

In some embodiments, the stator may be cleaned prior to its introduction into the furnace. For example, surfaces that will be nitrided (e.g., surfaces defining the inner bore) may be subjected to glass bead blasting to clean them prior to heating the stator and exposing it to a nitrogen-rich atmosphere. A surface roughness of the cleaned surface may be, for example, about 32 RMS microinches. In addition, one or more surfaces of the stator may be covered in a barrier material (e.g., a high-temperature, nitriding resistant paint) to inhibit nitrogen from diffusing into the stator at the surface or surfaces. For example, surfaces of the stator other than the interior surfaces defining the bore within which a rotor may be positioned (e.g., a radially outermost surface of the stator, longitudinal ends of the stator, and surfaces defining connection features for connecting the stator to the drill string) may be covered in the barrier material. The barrier material may comprise, for example, copper, bronze, nickel, tin, zinc, or silver, which may be applied by electroplating or by suspending the barrier material in a liquid carrier (e.g., alcohol-based or water-based liquids) and painting the resulting suspension onto the surface or surfaces. The coating may be removed after the nitriding process is complete (e.g., by stripping).

Once the nitrided region has been formed, the stator may be cooled from the elevated temperature, as indicated at 106. For example, the stator may be cooled to ambient temperature (e.g., about 74° F.). In some embodiments, the stator may be slow-cooled, such as, for example, by ceasing to heat the furnace and permitting the furnace to return to room temperature. In other embodiments, the stator may be actively cooled, such as, for example, by forced airflow or by quenching. The stator may be removed from the nitrogen-rich environment, as indicated at 107. For example, after the stator has been cooled to ambient temperature, the stator may be removed from within the furnace. As another example, the nitrogen-rich atmosphere may be replaced (e.g., with an inert atmosphere or with an atmosphere that is not nitrogen-rich, such as, for example, air) while the stator is cooled within the furnace.

Although a gas nitriding process has been described for forming a nitrided region extending from an exterior surface into the stator, other nitriding processes known in the art may be used to form the nitrided region. For example, salt bath nitriding and plasma nitriding may be used to form the nitrided region of the stator, replacing acts 102 through 106. The nitrided region may harden the exterior surface of the stator, increasing its erosion, abrasion and corrosion resistance.

In still other embodiments, the surfaces of the stator may be subjected to other hardening surface treatments. For example, the surfaces of the stator may be subjected to ferritic-nitro carburization, in which carbon is also present in the atmosphere with the nitrogen, and both carbon and nitrogen diffuse into the steel material of the stator. As another example, the surfaces of the stator may be subjected to a boronization process, in which boron is diffused into the steel material of the stator instead of or in addition to nitrogen.

After the desired surfaces of stator have been nitrided, a ceramic material lacking nitrogen may be coated on the nitrided regions of the stator, as indicated at 108. As a result of the nitriding or other surface treatment hardening process, attachment strength between the nitrided region and the ceramic material may be increased as compared to a ceramic material applied directly to a steel material. The ceramic material may comprise, for example, an inorganic ceramic compound. More specifically, the ceramic material may comprise silica, alumina, or a combination of silica and alumina. As a specific, nonlimiting example, the ceramic material may comprise Tech-12 or K-Tech K17, ceramic coatings commercially available from Bodycote K-Tech, Inc. of 111 K-Tech Ln., Hot Springs, Ark. 71913. The ceramic material may adhere to the treated regions of the stator. The ceramic material may be applied, for example, using a thermochemical process during which particles of the ceramic material (e.g., in powder form) are first suspended within a carrier material (e.g., an organic liquid to form a slurry), which may be applied to the nitrided region (e.g., by painting). The particles of ceramic material and the carrier material may then be heated to burn off the carrier material and sinter the particles of ceramic material, resulting in coalescence and densification of the ceramic material into a cohesive ceramic material. The ceramic material may increase the erosion, abrasion and corrosion resistance of the surfaces of the stator to which the ceramic material is applied.

The surface of at least a portion of the stator may be defined by the ceramic material. For example, the interior surfaces of the stator defining the bore into which the rotor is positioned may be defined by the ceramic material. The stator, and particularly the surfaces of the stator defining the bore into which the rotor is positioned, may lack elastomeric material employed in conventional stators, such as, for example, rubber, which may degrade in the high temperatures experienced during drilling. The resulting surfaces of the stator may be erosion, abrasion and corrosion resistant, and may be better able to withstand the high temperatures experienced in downhole environments without breaking down. For example, the stator may exhibit a longer service life than a similarly configured stator, the bore of which is lined with elastomeric material.

After the ceramic material has been applied, a rotor may be positioned within the bore of the stator, as indicated at 110. The rotor may be subjected to surface treatments to increase its erosion, abrasion, and corrosion resistance before being positioned within the stator. For example, a wear-resistant metal or metal alloy material may be applied to lobed outer surfaces of a rotor comprising a steel material. As used herein, the term "wear-resistant" means and includes corrosion resistance, abrasion resistance, erosion resistance, or any combination of these properties. For example, cobalt, nickel, chromium, or some combination or alloy of cobalt, nickel, and chromium may be thermally sprayed onto the steel material of the rotor, such as by high velocity oxy-fuel (HVOF) spraying, plasma spraying, detonation spraying, wire arc spraying, flame spraying, warm spraying, and cold spraying. The hardness of the wear-resistant metal or metal alloy may be, for example, greater than about 500 kgf/mm$^2$ on the Vickers hardness scale. Cemented tungsten carbide material applied to the rotor adjacent the wear-resistant material. The cemented tungsten carbide material may comprise, for example, microscale (i.e., sized between about 1 μm and about 500 μm) or nanoscale (i.e., sized between about 1 nm and about 500 nm) particles of tungsten carbide in a matrix material. The cemented tungsten carbide material may be coated on the outer surfaces of the rotor by, for example, thermal spraying or welding. Ceramic material other than tungsten carbide may then be applied over the cemented tungsten carbide material such that the cemented tungsten carbide material is located between the wear-resistant metal or metal alloy material and the ceramic material. The ceramic material may comprise, for example, any of the ceramic materials described previously in connection with the stator. When the rotor is positioned within the bore of the stator, contact between the ceramic outer surfaces of the rotor and the stator may be sufficient to build pressure of drilling fluid flowing within the stages of the downhole motor, and drive rotation of the rotor of the downhole motor. For example, the abutting ceramic surfaces of the rotor and the stator may form a seal therebetween.

Figure 2:
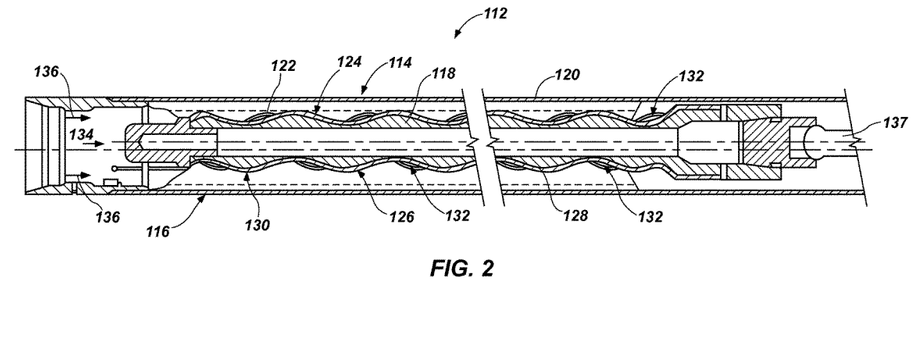
FIG. 2 is a cross-sectional side view of a downhole motor.

Referring to FIG. 2, a partial cutaway, partial cross-sectional side view of a downhole motor 112 is shown. The downhole motor 112 may include a power section 114, which may include a stator 116 and a rotor 118. The stator 116 may include an elongated metal housing 120 including an interior surface 122 defining a bore 124 extending through the housing 120. The interior surface 122 may be defined by a ceramic material 126 on the metal housing 120 and may be helically lobed in shape. The rotor 118 may be located within the bore 124 of the stator 116 and may be rotatable with respect to the stator 116 responsive to the flow of drilling fluid through the downhole motor 112. The rotor 118 includes a helically lobed exterior surface 128 configured to engage with (e.g., to contact and seal against) the helically lobed interior surface 122 of the stator 116. A ceramic material 130 may be formed on the exterior surface 128 of the rotor 118 prior to insertion within the stator. The seals formed between the rotor 118 and the stator 116 may involve direct ceramic-to-ceramic, metal-to-ceramic, or composite-to-ceramic material seals. At least in some embodiments, no material, such as an elastomeric material, that relies on elastic deformation to maintain a seal is used between the rotor 118 and the stator 116. The lack of such an elastomeric material may render the downhole motor 112 particularly suitable for drilling in high-temperature environments, such as, for example, geothermal wells.

The exterior surface 128 of the rotor 118 and the interior surface 122 of the stator 116 may have similar, but slightly different profiles. For example, the exterior surface 128 of the rotor 118 may have one fewer lobe than the inner surface 122 of the stator 116. The exterior surface 128 of the rotor 118 and the interior surface 122 of the stator 116 may be configured so that seals are established directly between the rotor 118 and the stator 116 at discrete intervals along and circumferentially around the interface between the rotor 118 and the stator 116, resulting in the creation of fluid chambers or cavities 132 between the exterior surface 128 of the rotor 118 and the inner surface 122 of the stator 116. In operation, cavities 132 may be filled with a pressurized drilling fluid 134 flowing through downhole motor 112.

As the pressurized drilling fluid 134 flows through the power section 114, as shown by flow arrows 136, the pressurized drilling fluid 134 causes the rotor 118 to rotate within the stator 116. The number of lobes and the geometries of the exterior surface 128 of the rotor 118 and interior surface 122 of the stator 116 may be modified to achieve desired input and output requirements and to accommodate different drilling operations. The rotor 118 may be coupled to a flexible shaft 137. The flexible shaft 137 may be connected to a drive shaft in a bearing assembly of the downhole motor. As previously mentioned, a drill bit or other component of a bottom-hole-assembly (BHA) may be attached to the drive shaft. For example, the drive shaft may include a threaded box, and a drill bit may be provided with a threaded pin that may be engaged with the threaded box of the drive shaft.

Figure 3:
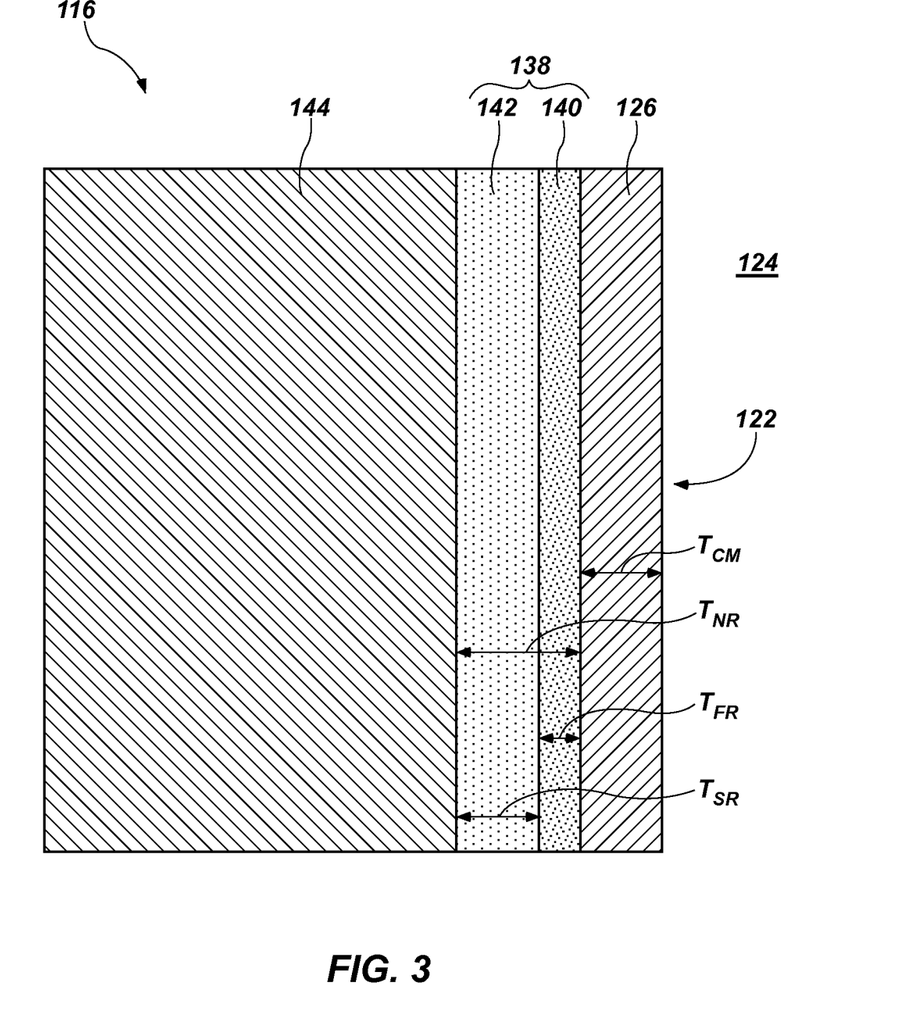
FIG. 3 is an enlarged, simplified cross-sectional view of a portion of a stator of the downhole motor of FIG. 2.

Referring to FIG. 3, an enlarged cross-sectional view of a portion of the stator 116 of the downhole motor 112 of FIG. 2 is shown. The interior surface 122 of the stator 116 defining the bore 124 may be defined by the ceramic material 126 applied to the nitrided or other hardening surface treated region 138 of the stator 116. A thickness $T_{CM}$ of the ceramic material 126 may be, for example, less than about 100 microns. More specifically, the thickness $T_{CM}$ of the ceramic material 126 may be, for example, between about 4 μin (~0.1 micron) and about 980 μin (~25 microns). As a specific, nonlimiting example, the thickness $T_{CM}$ of the ceramic material 126 may be between about 4 μin (~0.1 micron) and about 120 μin (~3 microns) (e.g., about 60 μin (~1.5 microns)).

The nitrided region 138 may be adjacent to the ceramic material 126. A thickness $T_{NR}$ of the nitrided region 138 may be, for example, less than about 0.05 in (~1,300 microns). More specifically, the thickness $T_{NR}$ of the nitrided region 138 may be, for example, between about 790 μin (~20 microns) and about 0.03 in (~760 microns) or between about 0.001 in (~25 microns) and about 0.03 in (~760 microns). As a specific, nonlimiting example, the thickness $T_{NR}$ of the nitrided region 138 may be, for example, between about 0.005 in (~130 microns) and about 0.015 in (~380 microns) (e.g., about 0.01 in (~250 microns)). A depth D of penetration of nitrogen into steel material of the stator 116, which may include penetration into a steel region 144 adjacent to the nitrided region 138 on a side of the nitrided region 138 opposing a side on which the ceramic material 126 is located, may be, for example, about 0.11 in (~2,800 microns) or less. More specifically, the depth D of penetration of nitrogen into steel material of the stator 116 may be, for example, between about 0.05 in (~1,300 microns) and about 0.1 in (~2,500 microns) (e.g., about 0.075 in (~1,900 microns)).

As noted previously in connection with FIG. 1, the nitrided region 138 may comprise, for example, a solid solution of interstitial nitrogen diffused among the ferrite lattice and nitride and/or carbon nitride precipitation. The nitrides of the nitrided region 138 may comprise, for example, $\epsilon\text{-Fe}_{2-3}(C, N)$; $\gamma'\text{-Fe}_4N$; or a mixture of $\epsilon\text{-Fe}_{2-3}(C, N)$ and $\gamma'\text{-Fe}_4N$ phases, commonly referred to as a "white layer" or "compound layer" resulting from the nitriding process. By way of contrast, the steel region 144 may lack nitride formation, though some interstitial nitrogen may have diffused among the ferrite lattice of the steel material 144. As a result of the nitriding process, attachment strength between the nitrided region 138 and the ceramic material 126 may be increased as compared to a ceramic material 126 applied directly to a steel material 144.

The nitrided region 138 may comprise, for example, a first region 140 adjacent to the ceramic material 126 and a second region 142 adjacent to the first region 140 on a side of the first region 140 opposing a side on which the ceramic material 126 is located. The first region 140 may exhibit a first concentration of nitrogen diffused into the first region 140, a remainder of which may comprise a steel material. The first concentration of nitrogen may be, for example, between about 3% and about 7% by atomic percent (i.e., the percentage of one kind of atom relative to the total number of atoms). More specifically, the first concentration of nitrogen may be, for example, between about 4% and about 6% (e.g., about 5%) by atomic percent. A thickness $T_{FR}$ of the first region 140 may be, for example, between about 200 μin (~5 microns) and about 0.01 in (~250 microns). More specifically, the thickness $T_{FR}$ of the first region 140 may be, for example, between about 0.005 in (~130 microns) and about 0.007 in (~180 microns) (e.g., about 0.006 in (~150 microns)). The second region 142 may exhibit a second, lower concentration of nitrogen that has diffused through the first region 140 into the second region 142. The second concentration may be, for example, less than about 4% by atomic percent. More specifically, the second concentration may be, for example, less than about 3% (e.g., about 2%) by atomic percent. The nitrogen concentration in at least the second region 142 may exhibit a gradient decreasing in nitrogen concentration as distance from the first region 140 increases. In some embodiments, the entire nitrided region 138 may exhibit a gradient in decreasing nitrogen concentration as distance from the ceramic material 126 increases. A thickness $T_{SR}$ of the second region 142 may be, for example, between about 200 μin (~5 microns) and about 0.010 in (~250 microns). More specifically, the thickness $T_{SR}$ of the second region 140 may be, for example, between about 0.005 in (~130 microns) and about 0.007 in (~180 microns) (e.g., about 0.006 in (~150 microns)).

Figure 4:
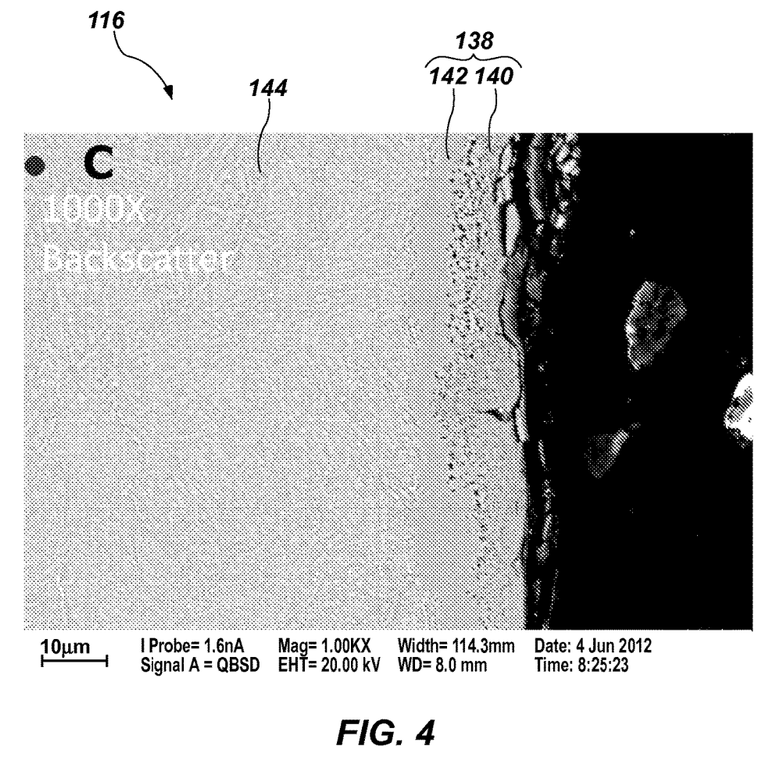
FIG. 4 is a micrograph of a portion of a stator like that of FIG. 3, illustrating a material of the stator.

Referring to FIG. 4, a micrograph of the portion of a stator 116 as shown in FIG. 3, illustrating the steel material 144 and nitrided region 138 of the stator 116 but not the ceramic material 126, is shown. Although the boundaries between the steel material 144 and the first and second regions 140 and 142 of the nitrided region 138 may not be linear and clearly demarcated, the microstructures of the steel material 144 and the first and second regions 140 and 142 of the nitrided region 138 may be visibly different from one another when viewed in an electron micrograph, such as that of FIG. 4.

Figure 5:
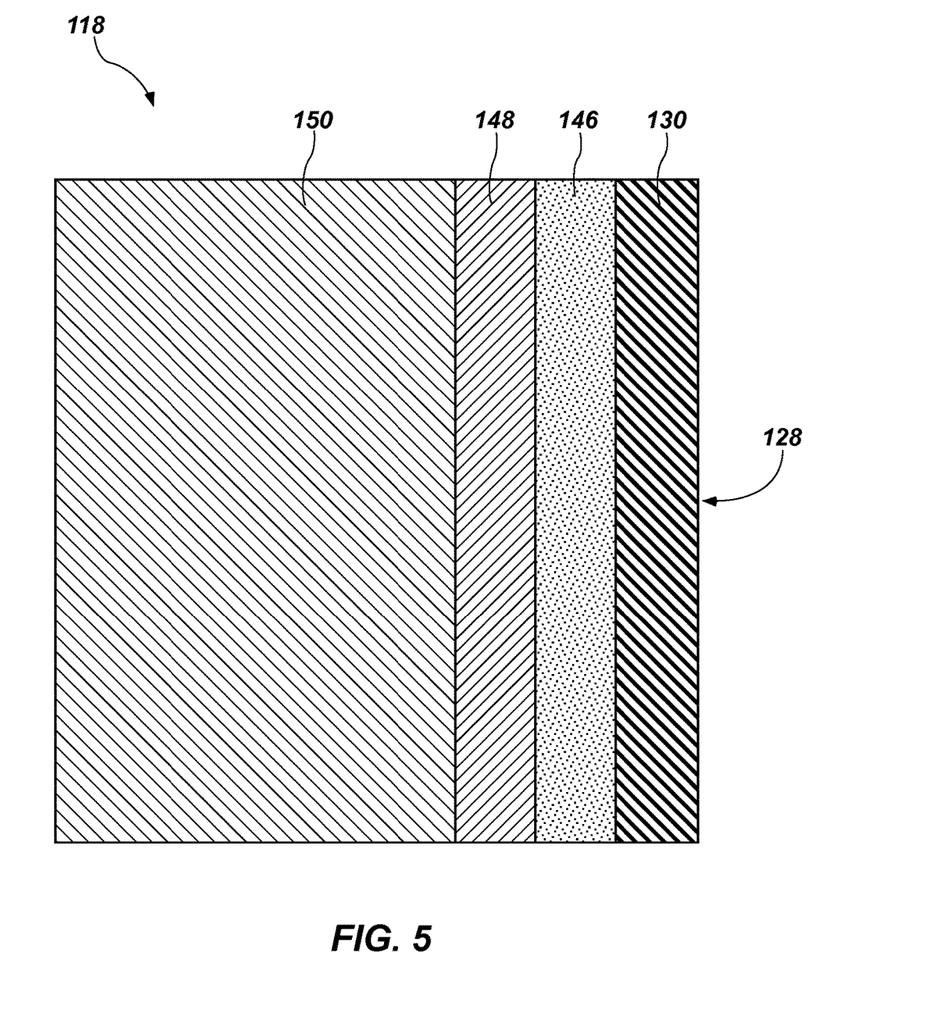
FIG. 5 is an enlarged cross-sectional view of a portion of a rotor of the downhole motor of FIG. 2.

Referring to FIG. 5, an enlarged cross-sectional view of a portion of the rotor 118 of the downhole motor 112 of FIG. 2 is shown. The rotor 118 may include a ceramic material 130, which may define an exterior surface 128 of the rotor 118. A tungsten carbide material 146 may be positioned adjacent to the ceramic material 130 on a side of the ceramic material 130 opposing the exterior surface 128. The tungsten carbide material 146 may be applied over a steel material 150 comprising an interior of the rotor 118.

In some embodiments, the rotor 118 may include a wear-resistant material 148 interposed between the tungsten carbide material 146 and the steel material 150. For example, cobalt, nickel, chromium, or some combination or alloy of cobalt, nickel, and chromium may be applied to the steel material 150 of the rotor 118 before the tungsten carbide material 146 is applied. The resulting rotor 118 and stator 116 combination may be resistant to erosion from the drilling fluid and abrasion from abrasive particles suspended in the drilling fluid flowing through the downhole motor 112 (see FIG. 2), corrosion from corrosive materials (e.g., additives) of the drilling fluid, and high temperatures experienced in the downhole environment and due to friction between the rotor 118 and the stator 116. In addition, the downhole motor 112 may lack any elastomeric materials that may more easily erode, abrade, corrode, and thermally degrade when compared to the materials for the rotor 118 and the stator 116 described herein.

Additional, nonlimiting embodiments within the scope of this disclosure include the following:

Embodiment 1

A downhole motor, comprising: a rotor; and a stator comprising a steel material and having a bore therethrough, wherein at least one surface of the stator comprising the bore has a surface treatment including: a nitrided region having nitrogen diffused into the steel material; and a ceramic material adjacent to the nitrided region, the ceramic material defining an interior surface of the stator.

Embodiment 2

The downhole motor of Embodiment 1, wherein a thickness of the nitrided region is in a range extending from 0.005 in (~130 microns) to 0.03 in (~760 microns).

Embodiment 3

The downhole motor of Embodiment 1 or Embodiment 2, wherein a depth of penetration of nitrogen into the steel material of the stator is 0.11 in or less.

Embodiment 4

The downhole motor of any one of Embodiments 1 through 3, wherein the nitrided region comprises: a first region adjacent to the ceramic material, the first region exhibiting a first concentration of nitrogen; and a second region adjacent to the first region on a side of the first region opposing a side on which the ceramic material is located, the second region exhibiting a second, lower concentration of nitrogen.

Embodiment 5

The downhole motor of Embodiment 4, wherein the first concentration of nitrogen is in a range extending from 4% to 6% by atomic percent.

Embodiment 6

The downhole motor of Embodiment 4 or Embodiment 5, wherein the second region exhibits a gradient decreasing in nitrogen concentration as distance from the first region increases.

Embodiment 7

The downhole motor of any one of Embodiments 1 through 6, wherein the ceramic material comprises at least one of silica and alumina.

Embodiment 8

The downhole motor of any one of Embodiments 1 through 7, wherein a thickness of the ceramic material is in a range extending form 4 μin (~0.1 micron) to 100 μin (~25 microns).

Embodiment 9

The downhole motor of any one of Embodiments 1 through 8, wherein the rotor comprises a steel material and a tungsten carbide material on a surface of the steel material.

Embodiment 10

The downhole motor of Embodiment 9, wherein the rotor comprises a ceramic material adjacent the tungsten carbide material on a side of the tungsten carbide material opposing the steel material, the ceramic material defining an exterior surface of the rotor.

Embodiment 11

The downhole motor of Embodiment 9, wherein the rotor comprises a wear-resistant metal or metal alloy material between the steel material and the tungsten carbide material.

Embodiment 12

The downhole motor of Embodiment 11, wherein the wear-resistant metal or metal alloy material comprises at least one of cobalt, nickel, and chromium.

Embodiment 13

The downhole motor of any one of Embodiments 1 through 12, wherein the downhole motor lacks any elastomeric material at an interface between the rotor and the stator.

Embodiment 14

A method of making a downhole motor, comprising: exposing a stator to an elevated temperature to heat the stator in a nitrogen-rich environment; diffusing nitrogen into a steel material of the stator and forming a nitrided region at an interior surface of the stator, the interior surface defining a bore for receiving a rotor within the stator; cooling the stator from the elevated temperature; removing the stator from the nitrogen-rich environment; coating a ceramic material on the nitrided region of the stator; and positioning a rotor within the stator bore.

Embodiment 15

The method of Embodiment 14, wherein exposing the stator to the elevated temperature comprises exposing the stator to a temperature of 800° F. (~430° C.) or greater.

Embodiment 16

The method of Embodiment 14 or Embodiment 15, wherein exposing the stator to the nitrogen-rich environment comprises exposing the stator to an environment comprising at least 60% by volume dissociated ammonia.

Embodiment 17

The method of any one of Embodiments 14 through 16, wherein diffusing nitrogen into the steel material of the stator comprises maintaining the stator exposed to the elevated temperature in the nitrogen-rich environment for at least 1 hour.

Embodiment 18

The method of Embodiment 17, wherein maintaining the stator exposed to the elevated temperature in the nitrogen-rich environment comprises maintaining the stator exposed to the elevated temperature in the nitrogen-rich environment for 8 days or less.

Embodiment 19

The method of any one of Embodiments 14 through 18, wherein forming the nitrided region on the interior surface of the stator comprises: forming a first region on the interior surface, the first region exhibiting a first concentration of nitrogen; and forming a second region adjacent to the first region, the second region exhibiting a second, lower concentration of nitrogen.

Embodiment 20

The method of any one of Embodiments 14 through 19, wherein forming the nitrided region comprises forming the nitrided region to exhibit a thickness in a range extending from 0.002 in (~50 microns) to 0.03 in (~760 microns).

Embodiment 21

The method of any one of Embodiments 14 through 20, further comprising applying a barrier material to at least a portion of a surface of the stator prior to diffusing nitrogen into the steel material of the stator and using the barrier material to inhibit diffusion of nitrogen the at least a portion of the surface of the stator.

Embodiment 22

The method of any one of Embodiments 14 through 21, further comprising omitting elastomeric material from an interface between the rotor and the stator.

Embodiment 23

A method of treating a stator for a downhole motor, comprising: subjecting a surface of a stator to a hardening surface treatment process; and coating a ceramic material on the hardened surface of the stator.

Embodiment 24

The method of Embodiment 23, wherein subjecting the surface of the stator to the hardening surface treatment process comprises nitriding the surface of the stator, ferritic-nitro carburizing the surface of the stator, or boronizing the surface of the stator.

Embodiment 25

The method of Embodiment 24, wherein nitriding the surface of the stator comprises gas-nitriding the surface of the stator, salt bath nitriding the surface of the stator, or plasma nitriding the surface of the stator.

Embodiment 26

The method of Embodiment 25, wherein gas-nitriding the surface of the stator comprises: exposing the stator to an elevated temperature to heat the stator in a nitrogen-rich environment; diffusing nitrogen into a steel material of the stator and forming a nitrided region at an interior surface of the stator, the interior surface defining a bore for receiving a rotor within the stator; removing the stator from the nitrogen-rich environment and cooling the stator from the elevated temperature Embodiment 27

The method of any one of Embodiments 23 through 27, further comprising maintaining the surface of the stator free of elastomeric material during the service life of the stator.

Embodiment 28

A downhole motor, comprising: a stator including an interior surface defining a bore; and a rotor located within the bore, and exterior surface of the rotor forming a seal against at least a portion of the surface of the stator defining the bore, wherein the downhole motor is free of elastomeric material at the seal between the rotor and the stator.

Embodiment 29

The downhole motor of Embodiment 28, wherein the stator comprises a steel material, the interior surface of the stator comprising having a surface treatment including: a nitrided region having nitrogen diffused into the steel material; and a ceramic material adjacent to the nitrided region, the ceramic material defining the interior surface.

While certain illustrative embodiments have been described in connection with the figures, those of ordinary skill in the art will recognize and appreciate that the scope of the disclosure is not limited to those embodiments explicitly shown and described herein. Rather, many additions, deletions, and modifications to the embodiments described herein may be made to produce embodiments within the scope of the disclosure, such as those hereinafter claimed, including legal equivalents. In addition, features from one disclosed embodiment may be combined with features of another disclosed embodiment while still being within the scope of the disclosure, as contemplated by the inventors.

What is claimed is:

1. A downhole tool being a downhole motor for use in earth-boring applications, comprising:
   an inner bore extending at least partially through a component of the downhole tool, the inner bore being defined by an inner surface of the component, the component comprising a steel material;
   wherein the inner surface comprises a surface treatment comprising:
   a nitrided region having nitrogen diffused into the steel material, the nitrided region comprising:
   a first portion of the nitrided region, the first portion exhibiting a first concentration of nitrogen; and
   a second portion of the nitrided region, the second portion adjacent to the first portion, the second portion exhibiting a second, lower concentration of nitrogen; and
   a ceramic material adjacent to the first portion of the nitrided region on a side of the first portion opposite the second portion of the nitrided region, the ceramic material defining the inner surface of the component.

2. The downhole tool of claim 1, wherein a thickness of the nitrided region is in a range extending from 0.002 in to 0.03 in.

3. The downhole tool of claim 1, wherein a depth of penetration of nitrogen into the steel material of the component is 0.11 in or less.

4. The downhole tool of claim 1, wherein the first concentration of nitrogen is in a range extending from 4% to 6% by atomic percent.

5. The downhole tool of claim 1, wherein the second portion exhibits a gradient decreasing in nitrogen concentration as distance from the first portion increases.

6. The downhole tool of claim 1, wherein the ceramic material comprises at least one of silica and alumina.

7. The downhole tool of claim 1, wherein a thickness of the ceramic material is in a range extending from 4 μin to 100 μin.

8. The downhole tool of claim 1, further comprising another component located within the inner bore, the other component being in sliding contact with at least a portion of the inner surface.

9. The downhole tool of claim 8, wherein the component defining the inner bore is a stator, and the other component is a rotor.

10. The downhole tool of claim 8, wherein the other component comprises a steel material and a cemented tungsten carbide material on a surface of the steel material.

11. The downhole tool of claim 8, wherein the other component comprises a ceramic material adjacent the cemented tungsten carbide material on a side of the cemented tungsten carbide material opposite the steel material of the other component, the ceramic material defining an exterior surface of the other component.

12. The downhole tool of claim 8, wherein the other component comprises a metal alloy material between the steel material of the other component and the cemented tungsten carbide material.

13. The downhole tool of claim 12, wherein the metal alloy material comprises at least one of cobalt, nickel, and chromium.

14. A method of making a downhole tool being a downhole motor for earth-boring applications, comprising:
exposing a component of the downhole tool to an elevated temperature to heat the component in a nitrogen-rich environment, the component comprising an inner bore extending at least partially through the component, the inner bore being defined by an inner surface of the component;
diffusing nitrogen into a steel material of the component to form a nitrided region on the inner surface of the component, the nitride region comprising a first portion of the nitride region exhibiting a first concentration of nitrogen and a second portion of the nitride region adjacent to the first portion, the second portion exhibiting a second, lower concentration of nitrogen;
cooling the component from the elevated temperature;
removing the component from the nitrogen-rich environment; and
coating a ceramic material on the nitrided region of the inner surface of the component.

15. The method of claim 14, wherein exposing the component to the elevated temperature comprises exposing the component to a temperature of 800° F. or greater.

16. The method of claim 14, wherein exposing the component to the nitrogen-rich environment comprises exposing the component to an environment comprising at least 60% by volume dissociated ammonia.

17. The method of claim 14, wherein diffusing nitrogen into the steel material of the component comprises maintaining the component exposed to the elevated temperature in the nitrogen-rich environment for at least 1 hour.

18. The method of claim 17, wherein maintaining the component exposed to the elevated temperature in the nitrogen-rich environment comprises maintaining the component exposed to the elevated temperature in the nitrogen-rich environment for 8 days or less.

19. The method of claim 14, wherein forming the nitrided region comprises forming the nitrided region to exhibit a thickness in a range extending from 0.002 in to 0.03 in.

20. The method of claim 14, further comprising applying a barrier material to at least a portion of another surface of the component prior to diffusing nitrogen into the steel material of the component and using the barrier material to inhibit diffusion of nitrogen into the at least a portion of the other surface of the component.

* * * * *

UNITED STATES PATENT AND TRADEMARK OFFICE
CERTIFICATE OF CORRECTION

PATENT NO. : 9,843,244 B2
APPLICATION NO. : 14/800359
DATED : December 12, 2017
INVENTOR(S) : Kyle L. Taylor, Chih C. Lin and Denis S. Kopecki It is certified that error appears in the above-identified patent and that said Letters Patent is hereby corrected as shown below:

In the Specification

Column 3, Line 49, change "414511 MOD steel" to --4145H MOD steel--

Signed and Sealed this
Twenty-ninth Day of May, 2018

Andrei Iancu
*Director of the United States Patent and Trademark Office*